G. E. M. G. B. DE SALABERRY.
THRESHING MACHINE.
APPLICATION FILED APR. 18, 1912.
1,163,513.
Patented Dec. 7, 1915.
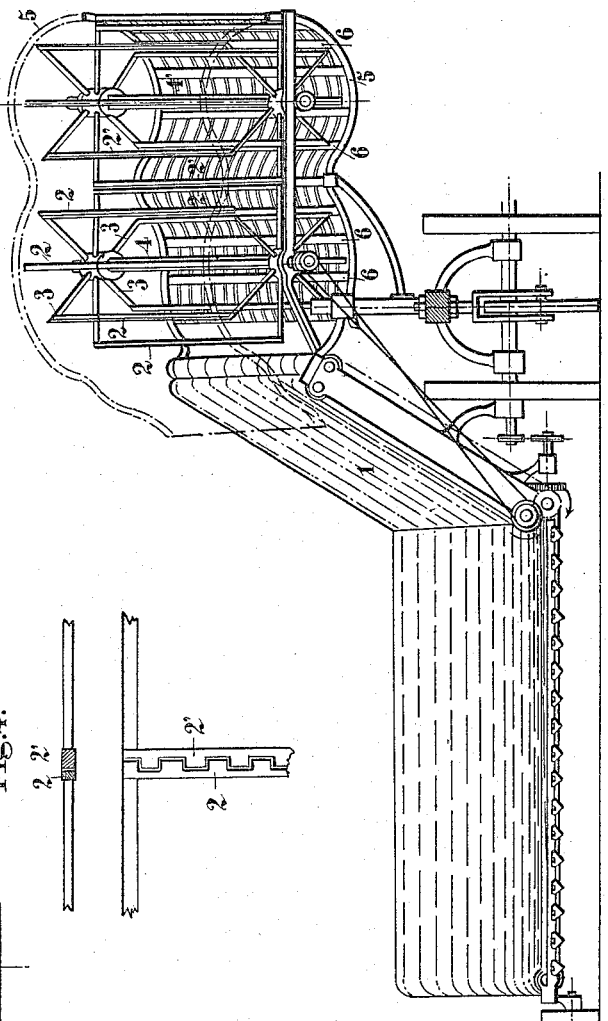
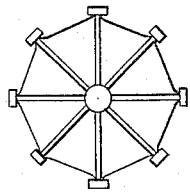
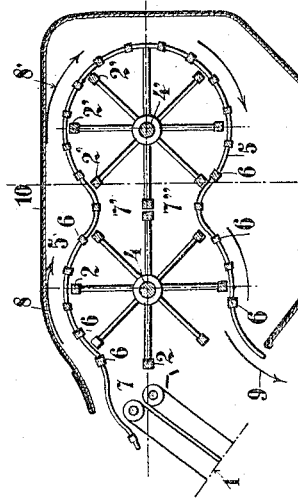
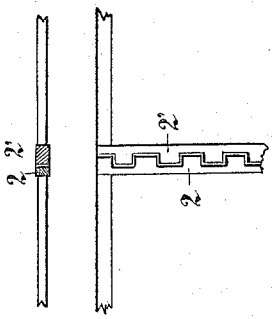
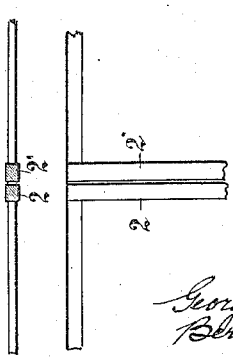
WITNESSES:
John Murtagh
L. M. Dorman
INVENTORS
Georges Erhard Marie Guy
Bernard de Salaberry
BY
Goepel Goepel
his ATTORNEYS.

UNITED STATES PATENT OFFICE.

GEORGES ERHARD MARIE GUY BERNARD DE SALABERRY, OF FOSSÉ, FRANCE.

THRESHING-MACHINE.

1,163,513.  Specification of Letters Patent.  Patented Dec. 7, 1915.

Application filed April 18, 1912. Serial No. 691,556.

*To all whom it may concern:*

Be it known that I, GEORGES ERHARD MARIE GUY BERNARD DE SALABERRY, a citizen of the Republic of France, residing in Fossé, Loir-et-Cher, France, have invented new and useful Improvements in Threshing-Machines, which improvements are fully set forth in the following specification.

Different forms of threshing machines are known, which, after the grain has been threshed out, permit of the immediate separation of the grains and the stalks. One of these devices in particular is characterized by the employment of a rotary beater and a counter beater arranged either perpendicularly to the tractor device and striking the cereals perpendicularly to the stalks in the portion not seized by the chains of the said tractor or parallel with the tractor device and seizing the cereals throughout the entire length of their stalks. This rotary beater can be utilized either with a view to complete threshing or for completing the work of threshing by combs.

The present invention relates to a form of the machine in which the total threshing is insured by means of a double rotary beater. This system of double rotary threshing is represented by way of example in the accompanying drawing, in which the shafts of the beaters are arranged parallel with the tractor device although it should be understood that these shafts might equally well be arranged perpendicularly to the said device.

Figure 1 is a perspective view of the machine. Fig. 2 is a cross section of the beater system. Figs. 3 and 4 relate to details of the beater bars and Fig. 5 is a section of a modified construction of the beater-bars.

The primary beater is formed of bars 2 which may be of wood, metal or any other appropriate material carried by arms 3 radiating from a shaft 4 parallel with the tractor 1, in the case represented is combined with a second beater analogous to the first, the shaft 4′ of which is parallel with the shaft 4. The shafts 4, 4′ are supported in suitable bearings of the thresher-frame and an appropriate transmission connects directly or indirectly said shafts with the driving axle and produces a movement of rotation of the two beaters. The interval between the shafts 4 and 4′ is such that the corresponding bars 2 2′ of the two devices pass as close as possible to each other.

Instead of making the two beaters open-work, they might be solid in which case the bars 2 2′ are united by sheets of metal to prevent the choking which might occur in open-work beaters as shown in Fig. 5.

The counter beater or breasting 5 is to some extent common to the two beaters. This counter beater may be formed of gratings, iron rods or wooden bars composing an openwork surface suitable both for the threshing and for the escape of the threshed grains or it may be constituted by bars, blades or rods 6 arranged parallel (in the case here illustrated) or perpendicularly (or else parallel and perpendicularly) to the shafts 4, 4′ furnishing an openwork surface. In any case the openwork surface can be curved almost to the junction with the bars 2, 2′ of the two beaters or they may not be curved or be curved in an intermediate manner.

The bars, blades or rods of the counter-beater are fixed and rigid, so that the space separating them from the beaters is constant, or mounted on links, slides or otherwise, so that said space may vary according to the greater or less thickness of the layer of stalks to be submitted into the beater device. The counter beater may also be provided with salient portions which facilitate the threshing.

The tractor may be composed either of aprons constituted by chains, cables or endless belts or of endless sheets.

In any case the stalks of the cut cereals raised by the tractor system are delivered at 7 (Fig. 2) where they are seized and carried along by the bars 2 of the first beater rotating in the direction of the arrow 8 and undergoing a preliminary threshing operation from 7 to 7′ owing to the combined action of the bars 2 of the said beater and of the bars 6 of the counter beater. At 7′ they are seized and carried along by the bars 2 of the second beater rotating in the direction of the arrow 8′; the threshing being completed from 7' to 7" by the action of the bars 2' of this second beater and of the bars 6 of the counter beater. At 7" the stalks are again seized by the bars 2 of the first beater and carried toward the outlet from the beater system after having experienced a secondary supplementary threshing which removes from the cereals any grains that may have remained in them. The straw escapes from the beater system as indicated by the arrow 9 (Fig. 2).

A box or drum 10 of suitable form surrounding the beater system collects the grains when they leave the breasting. The discharge of the grains from this drum is effected either through an aperture 11 (Fig. 2) arranged at its lowest part or naturally at the lower edge.

It has already been stated that the bars 2 and 2' of the two rotary beaters almost contact on their passage as indicated in Fig. 3. In order to prevent the stalks from having a tendency at 7' to enter the interval then formed between the bars, these bars 2 and 2' may be crenelated as shown in Fig. 4. The same result can also be obtained when the bars of the two beaters all but come into contact, either by imparting a more rapid movement of rotation to one of the apparatus or by providing the second beater with bars presenting a rougher surface which give it a better hold on the straw and prevent it from being carried along by the first apparatus. Finally, it should be noted that the threshing apparatus can be rendered operative independently of any animal or mechanical traction of the harvester by a motor of any kind arranged on the machine. This motor may itself actuate the blades, the endless aprons and the entire mechanism simultaneously or it may merely actuate the threshing apparatus, the traveling over the field and the operation of the parts not actuated by this motor being reserved for the animal or mechanical traction.

In practice the lower part of the counter beater might be omitted, its purpose being to complete the threshing of the grain and the cleaning of the stalks by a shaker permitting of obtaining the same result.

The shaker can be constituted by rods, bars, strips or the like to which a crank shaft or cams impart a reciprocating movement which serves to facilitate the discharge of the stalks separated from the grain while at the same time freeing them from any grains that may still adhere to them. Similarly metal rods might be substituted for this shaker, these rods being given a vibratory movement by the operation of the machine itself and presenting an inclined plane for the stalks might suffice for their discharge. The grain also passes through a grating arranged beneath the shaker and which is intended to stop the small debris which may be mixed with this grain.

What I claim and desire to secure by Letters Patent of the United States is:—

1. A threshing machine for separating the grain from the stalks of cereals, comprising shafts arranged parallel with one another, rods radiating from the ends of said shafts, and bars connecting said rods to form rotary beaters on said shafts, and a counter-beater coacting with said rotary beaters, extending along the upper side of the said rotary beaters, over the outer end, and along the underside thereof, following the path of the cereal along said beaters, for the purpose of effecting a complete separation of the grain from the stalks, and means for feeding the cereal to the said beaters.

2. A threshing machine for separating the grain from the stalks of cereals, comprising shafts arranged parallel with one another, rods radiating from the ends of said shafts, and bars connecting said rods to form rotary beaters on said shafts, and a counter-beater coacting with said rotary beaters, extending along the upper side of the said rotary beaters, over the outer end, and along the underside thereof, following the path of the cereal along said beaters, the said counter-beaters terminating in an opening through which the stalks pass, for the purpose of effecting a complete separation of the grain from the stalks, and means for feeding the cereal to the said beaters, said beaters being arranged within a casing or hood having an aperture at its lower end.

3. A threshing machine for separating the grain from the stalks of cereals, comprising shafts arranged parallel with one another, rods radiating from the ends of said shafts, members supported between the said rods forming beating surfaces, and a stationary counter-beater coacting with said rotary beaters, extending along the upper side of the rotary beaters, over the outer end and along the underside thereof, inclosing the peripheries of the said beaters at the upper and lower sides thereof, and at the outer end, following the path of the cereal along the said beaters, for the purpose of effecting a complete separation of the grain from the stalks, and means for feeding the cereal to the said beaters.

4. A threshing machine for separating the grain from the stalks of cereals, comprising parallel shafts, rods radiating from the ends of said shafts, and having bars connecting the corresponding bars on each side, said bars inclosing the periphery of a cylinder, the said bars of each beater coacting with one another and being crenelated for the purpose of preventing the straw from falling through the interval between them, a counter-beater coacting with said rotary beaters and consisting of a beating surface surrounding the peripheries of said rotary beaters and formed of parallel rods or bars, said beaters being arranged in a hood or casing having an aperture therein for discharging the grain.

In testimony whereof I have signed this specification in the presence of two subscribing witnesses.

GEORGES ERHARD MARIE
GUY BERNARD DE SALABERRY.

Witnesses:
H. C. COXE,
EMILE LEDRET.

Copies of this patent may be obtained for five cents each, by addressing the "Commissioner of Patents, Washington, D. C."